United States Patent
Takii et al.

[11] Patent Number: 5,152,539
[45] Date of Patent: Oct. 6, 1992

[54] FERROFLUID SEAL APPARATUS

[75] Inventors: Hirokazu Takii; Tetsuo Oda; Shinji Abe; Kazuya Suzuki; Hirotsugu Kusano, all of Osaka, Japan

[73] Assignee: Koyo Seiko Co., Ltd., Osaka, Japan

[21] Appl. No.: 586,376

[22] Filed: Sep. 21, 1990

Related U.S. Application Data

[63] Continuation of Ser. No. 219,198, Jul. 15, 1988, abandoned.

[30] Foreign Application Priority Data

Jul. 17, 1987 [JP] Japan ............... 62-110519[U]
Sep. 10, 1987 [JP] Japan ............... 62-138777[U]
Mar. 4, 1988 [JP] Japan ............... 63-52340

[51] Int. Cl.⁵ .................... F16J 15/40; F16C 33/82
[52] U.S. Cl. ............................... 277/80; 277/37; 277/135; 384/446
[58] Field of Search ............... 277/58, 80, 37, 135; 384/478, 446

[56] References Cited

U.S. PATENT DOCUMENTS

| | | | |
|---|---|---|---|
| 2,996,162 | 8/1961 | Lehde | 277/58 X |
| 4,293,137 | 10/1981 | Ezekiel | 277/80 |
| 4,557,612 | 12/1985 | Neal | 384/477 X |
| 4,692,826 | 9/1987 | Raj et al. | 384/478 |
| 4,817,964 | 4/1989 | Black, Jr. | 384/477 X |
| 4,890,940 | 1/1990 | Schmidt et al. | |

FOREIGN PATENT DOCUMENTS

| | | | |
|---|---|---|---|
| 12556 | 6/1980 | European Pat. Off. | 277/80 |
| 1461115 | 10/1966 | France | 384/477 |
| 12167 | 1/1982 | Japan | 277/80 |
| 58-191423 | 12/1983 | Japan | 277/80 |

Primary Examiner—Allan N. Shoap

[57] ABSTRACT

A ferrofluid seal apparatus comprises magnetic fluid holding or positing means for storing or retaining a magnetic fluid in a sealing arrangement wherein inner and outer elements are relatively rotated. The magnetic fluid holding means includes an arrangement for retaining the magnetic fluid which flows out from its original position.

10 Claims, 13 Drawing Sheets

FERROFLUID SEAL APPARATUS

This application is a continuation of application Ser. No. 07/219,198 filed on Jul. 15, 1988, now abandoned.

BACKGROUND OF THE INVENTION

The present invention relates to a ferrofluid seal apparatus and, in particular, to a ferrofluid seal apparatus suitable for a bearing, motor and the like.

FIG. 9 is a cross-sectional view of a conventional seal apparatus. The seal apparatus of FIG. 9 comprises a shaft 1, a housing 2, and an annular magnet 3. The shaft 1 is inserted coaxially into the housing 2 which is cylindrical. The annular magnet 3 is fixed to the inner side of an opening in the housing 2. Magnetic fluid 4 is retained in a small radial gap between the inner side of the annular magnet 3 and the outer side of the shaft. The North-South Pole of the annular magnet 3 is polarized axially, so as to form a magnet circuit with the shaft 1. The magnet circuit causes the magnet fluid 4 to be retained in the radial gap.

Normally, the amount of magnetic fluid 4 provided is somewhat more than the capacity of the radial gap. The magnetic fluid 4 adheres to the sides of the annular magnet 3 by virtue of a surface tension operation.

In the above-described seal apparatus, the shaft 1 is rotated, while the housing 2 is stationary. In other words, the shaft 1 should not be held stationary and the housing 2 should not be rotated. In this regard, the following problem will occur if the above-described seal apparatus is used in the mechanism in which the shaft 1 is stationary and the housing 2 is rotated. When the housing 2 is rotated, the annular magnet 3 fixed to the housing 2 is also rotated. The amount of magnetic fluid 4 attracted by rotating the annular magnet 3 is much more than in the case of rotating the shaft 1. Greater centrifugal force is applied to the magnetic fluid 4. Here, a portion of the magnetic fluid 4 positioned in the radial gap tends to move toward the housing 2 along the sides of the magnet 3 as indicated with the arrows in FIG. 9. Thus, an improved structure for stably sustaining the magnetic fluid 4 within the radial gap has not been proposed in the bearing field.

Further, in the bearing field a structure for preventing the magnetic fluid from moving and splashing due to the rotation of the bearing has not been proposed. In the motor field, a seal apparatus showing a good sealing property has not been proposed.

SUMMARY OF THE INVENTION

Accordingly, it is an object of the present invention to provide an improved structure for stably sustaining a magnetic fluid within a particular position.

It is another object of the present invention to provide an improved structure for preventing a magnetic fluid from changing position and splashing.

It is further object of the present invention to provide an improved sealing structure showing good sealing characteristics.

Briefly described, in accordance with the present invention, a seal apparatus for storing or retaining a magnetic fluid comprises magnetic fluid holding or positioning means for storing a magnetic fluid wherein inner and outer elements are relatively rotated. The magnetic fluid holding means includes an arrangement for retaining the magnetic fluid which flows out from its original position.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

Figure 1:
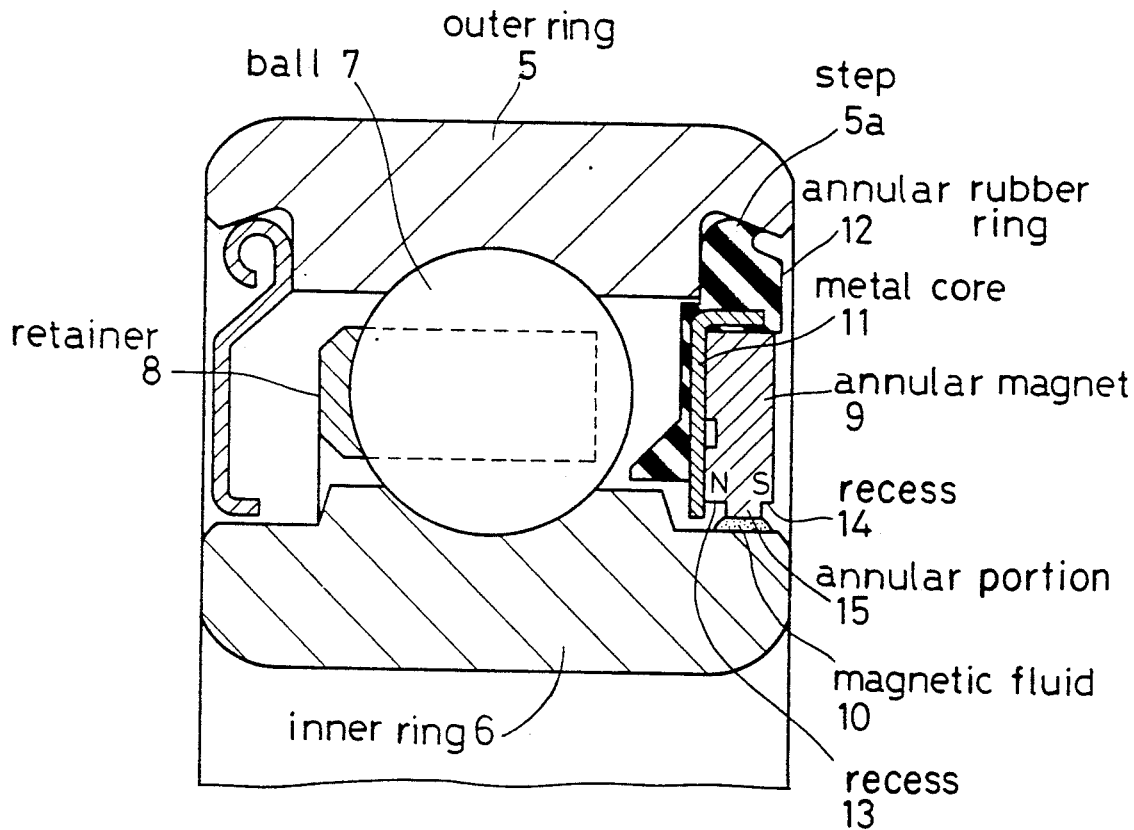
FIG. 1 is a cross-sectional view of upper parts of a ball bearing incorporating a seal apparatus according to the first preferred embodiment of the present invention.

FIG. 1 shows a ball bearing incorporating a seal apparatus between its inner and its outer rings according to the first preferred embodiment of the present invention. There is provided an annular outer ring 5, an inner ring 6, a ball 7, a retainer 8 for holding the ball 7, an annular magnet 9 having a polarization of the North and the South Pole axially, and a magnetic fluid 10.

The outer side of the annular magnet 9 is fixed to a step 5a formed at the shoulder of the inner side of the outer ring 5 via an annular rubber ring 12. The ring 12 has a metal core 11. Recesses 13 and 14 are formed at both sides of the inner side of the annular magnet 9. The recesses 13 and 14 extend along the inner circumference of the magnet 9 and face the area in which the magnetic fluid 10 is positioned. The recesses 13 and 14 form an annular narrow portion 15 at the inner surface of the annular magnet 9. The distance between the cylindrical faces of the recesses 13 and 14, and the outer face of the inner ring 6 is larger than the distance between the cylindrical face of the annular portion 15 and the outer face of the inner ring 6.

The magnetic fluid 10 is located between the cylindrical face of the annular portion 15 and the outer face of the inner ring 6, so that the magnetic fluid 10 is maintained in this position by a magnetic circuit formed between the annular magnet 9 and the inner ring 6. The magnetic fluid 10 is positioned near to the central portions of the axial direction of the annular magnet 9, rather than adjacent to the edges of the magnet 9, so that the magnetic fluid 10 is prevented from extending outwardly.

When the inner ring 6 is stationary and the outer ring 5 is rotated, the annular magnet 9 is rotated together with the outer ring 5. The flowing or moving volume of the magnetic fluid 10 is greater in such a case than in the case of rotating the inner ring 6. The force for forcing the magnetic fluid 10 outwardly in a radial direction of the diameter of the annular magnet 9 is increased. Therefore, the magnetic fluid 10 tends to move outwardly as explained in the description of the background of the invention, even if a part of the magnetic fluid 10 held between the annular portion 15 and the inner face of the inner ring 6 moves outwardly, this part of the magnetic fluid 10 is positioned in or caught by the recesses 13 and 14 which serve as holding or positioning means, disposed at both sides of the annular magnet 9, for storing or retaining the magnetic fluid 10.

The retained or held magnetic fluid 10 cannot go along the side of the annular magnet 9 up to the outer ring 5. In the case where the depth of the recesses 13 and 14 is set rather shallow as indicated in FIG. 1, the retained magnetic fluid 10 received by the recesses 13 and 14 is attracted by the remaining part of the magnetic fluid 10 positioned between the annular portion 15 and the inner ring 6. The retained magnetic fluid 10 is thus returned to its original position.

Further in this preferred embodiment, the metal core 11 of the annular rubber ring 12 provided at one side of the annular magnet 9 can further block movement of the retained magnetic fluid 10 caught by the recess 13. The metal core 11 may be made of a magnetic material or a non-magnetic material. In the case of a magnetic material, the metal core 11 exists as pole piece means, in case of a non-magnetic material, the metal core 11 exists as a side member. If it is made of a magnetic material, another magnetic circuit is formed between the metal core 11 and the inner ring 6 as well as the above-mentioned magnetic circuit. Then, part of the magnetic fluid 10 can be caught between the inner face of the metal core 11 and the outer face of the inner ring 6. Thus, a duplex seal unit sealing the magnetic fluid 10 in the axial direction of the annular magnet 9 is provided to improve pressure-capacity.

In FIG. 1, the seal apparatus of the magnetic fluid 10 is positioned at only one side of the ball bearing while a non-contact type seal is provided at the other side. Of course, the seal unit can be provided at both sides of the ball bearing.

Figure 2:
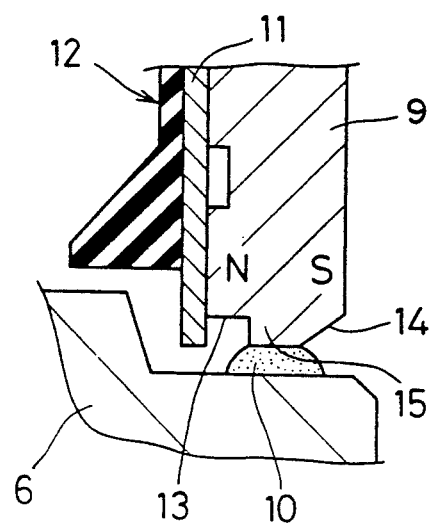
FIGS. 2 through 8 are cross-sectional views of ball bearings incorporating seal apparatus according to the second through the eighth preferred embodiment of the present invention.

FIG. 2 shows a seal apparatus according to the second preferred embodiment of the present invention. Like elements corresponding to those of FIG. 1 are denoted by like numerals.

The seal apparatus of the second preferred embodiment differs from that of the first preferred embodiment in that the shape of the recess 14 positioned at the outer side of the ball bearing includes a surface tapered outwardly and obliquely with greater diameters.

In such construction, it seems that the magnetic fluid 10 readily moves out from the gap between the annular portion 15 and the inner ring 6 during the rotation. But, a narrow space is formed at a near portion to the portion 15 in the gap between the annular recess 14 and the inner ring 6, and capillary phenomena occurs at the narrow space. This capillary phenomena prevents the magnetic fluid 10 from moving outwardly. Therefore, during the rotation, the magnetic fluid 10 is prevented from moving toward the recess 14.

Figure 3:
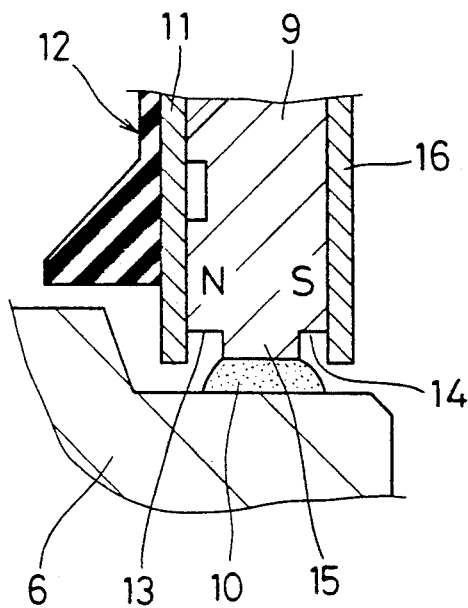

FIG. 3 shows a seal apparatus according to the third preferred embodiment of the present invention. Like elements corresponding to those of FIG. 1 are denoted by like numerals.

In the third preferred embodiment of the present invention, in addition to the structure of the first preferred embodiment, a side member 16 is provided at the outer side (the South Pole) of the annular magnet 9. The radial gap between the inner side of the side member 16 and the outer side of the inner ring 6 is set narrower than that between the cylindrical face of the recess 14 and the outer face of the inner ring 6. The gap between the inner end of the side member 16 and the outer side of the inner ring 6 forms a non-contact seal.

With this non-contact seal structure, the part of the magnetic fluid 10 moving due to the rotation and caught by the recess 14 is further prevented from moving outwardly.

With this arrangement dust cannot enter the external side. The part of the magnetic fluid 10 caught by the recess 14 during rotation is returned to the original position by being attracted toward the gap between the annular portion 15 of the annular magnet 9 and the inner ring 6 upon the rotation being stopped because the side member 16 is made of a non-magnetic material.

Figure 4:
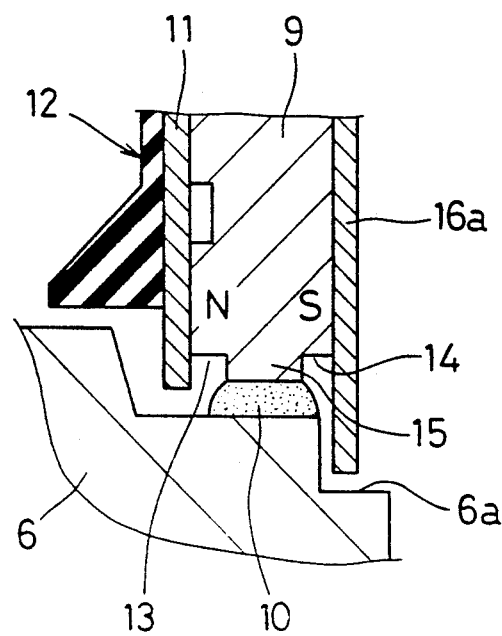

FIG. 4 shows a seal apparatus according to the fourth preferred embodiment of the present invention which is a modification of the third preferred embodiment. A step 6a is provided at the outer edge of the inner ring 6 while the length of a side member 16a is extended toward the inner ring 6, so that the gap between the side member 16a and the cylindrical face of the step 6a is made narrow.

With the non-contact seal structure of the third preferred embodiment being thus further modified, even if a part of the magnetic fluid 10 moves from the position between the annular portion 15 and the inner ring 6 to the recess 14, this magnetic fluid 10 is surely prevented from flowing outwardly. In addition, protection against dust is provided.

Figure 5:
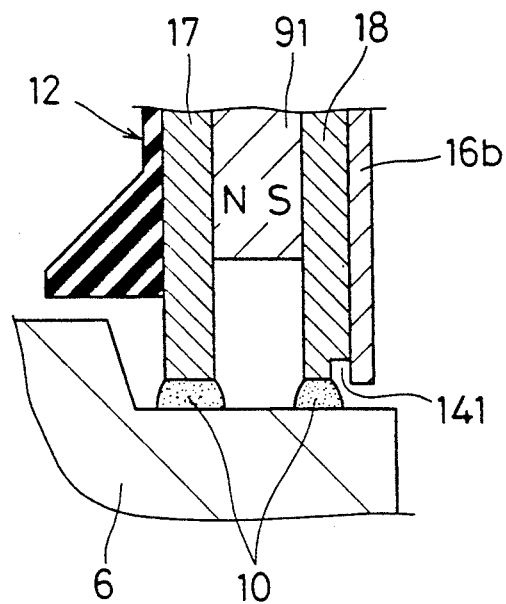

FIG. 5 shows a seal apparatus according to the fifth preferred embodiment of the present invention. There is provided an annular magnet 91, and a pair of annular pole pieces 17 and 18 located at both sides of an annular magnet 91.

The magnetic fluid 10 is maintained between the pole pieces 17 and 18, and the outer face of the inner ring 6.

In this preferred embodiment, an annular side member 16b is provided at the outer side of the pole piece 18. A recess 141 is provided for storing or retaining a part of the magnetic fluid 10. The recess 141 is formed between the pole piece 18 and the side member 16b. The recess 141 extends along the side of the annular side member 16b. The seal unit of the fifth preferred embodiment attains the same function as that of the fourth preferred embodiment.

Figure 6:
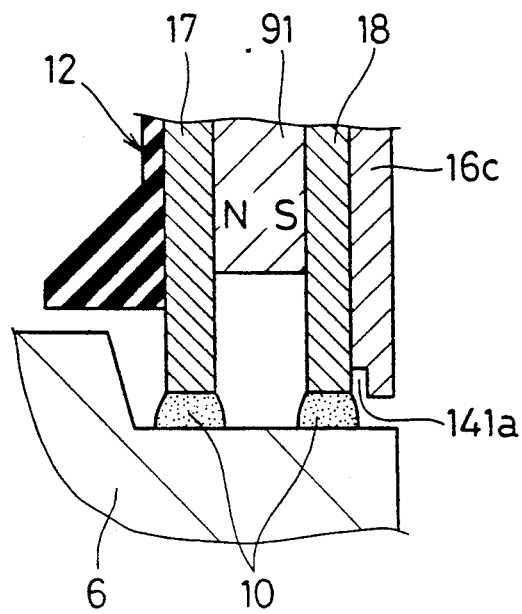

FIG. 6 shows a seal apparatus according to the sixth preferred embodiment of the present invention, which is a modification of the fifth preferred embodiment. In this preferred embodiment, a recess 141a is provided for storing or retaining a part of the magnetic fluid 10 in the inner face of a side member 16c located next to the pole piece 18. In such a case, preferably, the inner diameter of the side member 16c is set equal to or smaller than that of the pole piece 18, so that a part of the magnetic fluid 10 can be effectively caught.

Figure 7:
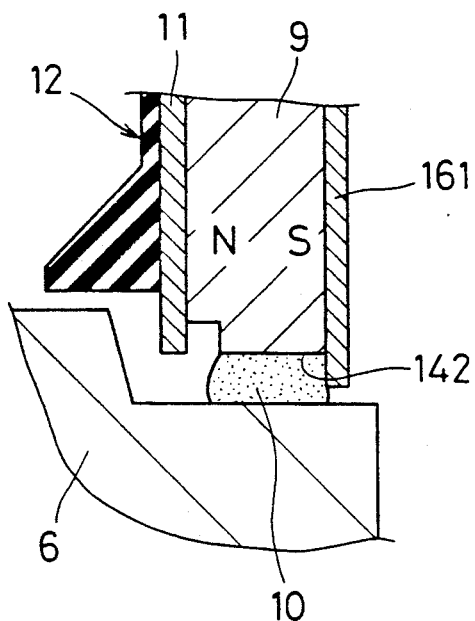

FIG. 7 shows a seal apparatus according to the seventh preferred embodiment of the present invention. An annular side member 161 is provided having a smaller diameter than the inner diameter of the annular magnet 9. The annular side member 161 is positioned at the outer side of the axial direction of the annular magnet 9. A space 142 is formed, for storing or retaining a part of the magnetic fluid, with the inner side of the annular magnet 9 and the annular side member 161. Upon rotation, a part of the magnetic fluid 10 flows into engagement with the inner side of the side member 161.

Upon stopping, this part of the magnetic fluid 10 is returned to the space 142 because the side member 161 is non-magnetic.

Figure 8:
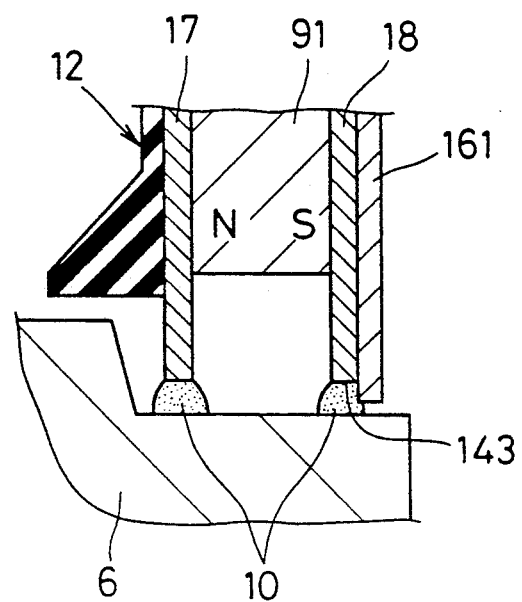
Figure 9:
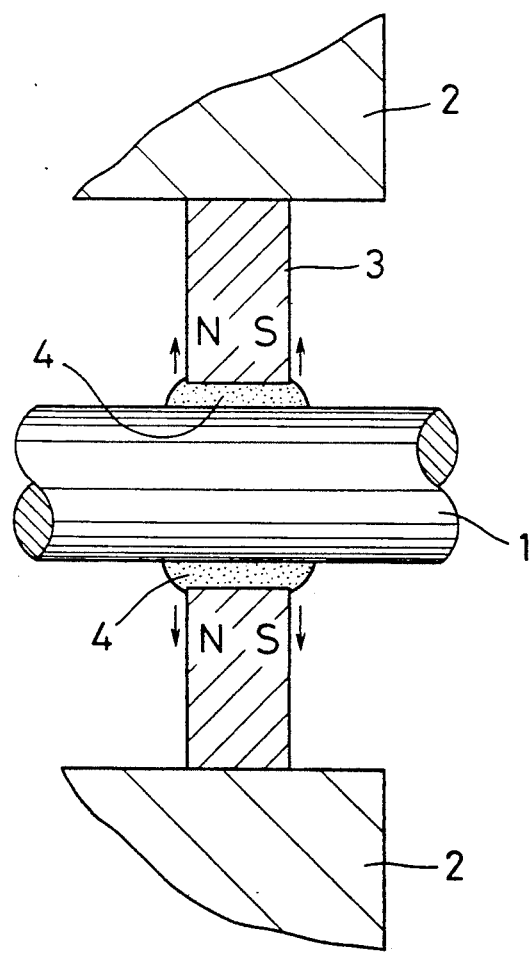
FIG. 9 is a cross-sectional view of a conventional seal apparatus.

FIG. 8 shows a seal apparatus according to the eighth preferred embodiment of the present invention, which is a modification of the seventh preferred embodiment. In place of the annular magnet 9, as a magnetic pole element, the annular magnet 91 and the annular pole pieces 17 and 18 are provided similar to those of the fifth preferred embodiment. The annular pole pieces 17 and 18 are provided at both sides of the annular magnet 91. A space 143 is provided with the inner face of the pole piece 18 and side member 161 having a smaller inner diameter than that of the pole piece 18. The space 143 stores or retains a part of the magnetic fluid 10.

In the above preferred embodiments of the present invention, the seal apparatus is provided between the inner and the outer rings of the bearing. However, the gist of the preferred embodiments should not be limited to these structures, but could be applied to a structure wherein the seal unit is provided between the inner element and the outer element which are coaxially arranged.

According to the first through the eighth preferred embodiments, a magnetic fluid storage section is arranged which has a magnetic fluid holding or positioning means comprising a magnetic pole member, for storing or retaining a magnetic fluid. When the outer element and the magnetic fluid holding means are rotated, the magnetic fluid can be held within the magnetic fluid storage section without flowing to the exterior. Thus, the magnetic fluid can be stably maintained within the magnetic fluid holding or positioning means and the outer face of the inner element to thereby provide a sealing effect of the magnetic fluid.

Figure 10:
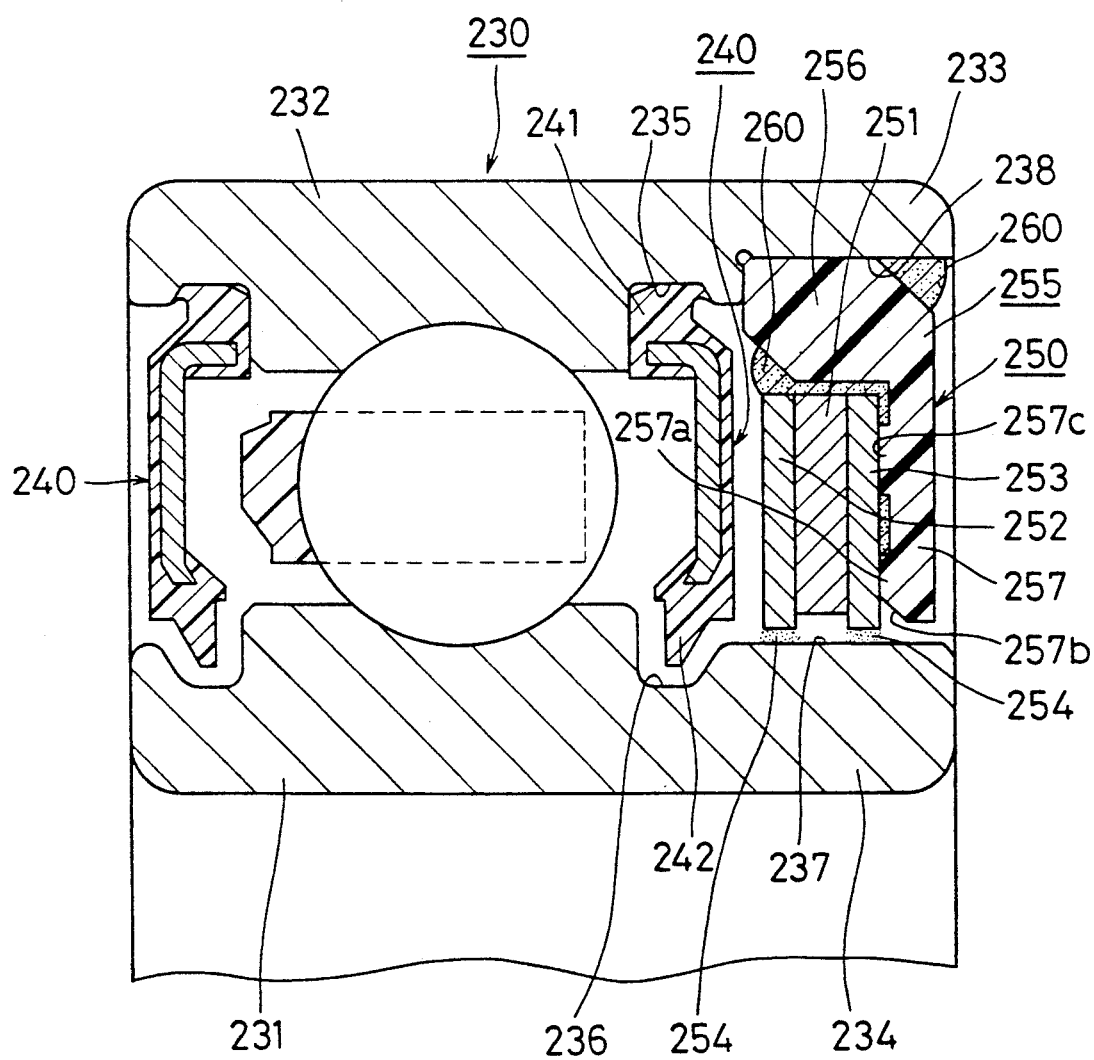
FIG. 10 is a cross-sectional view of upper parts of a bearing incorporating a seal apparatus according to the ninth preferred embodiment of the present invention.

FIG. 10 shows a seal apparatus according to the ninth preferred embodiment of the present invention when applied to a bearing 230. In the bearing 230, an end of each of an inner ring 231 and an outer ring 232 along its axis is extended axially t provide extensions 233 and 234. A non-contact seal member 240 is disposed between the extensions 233 and 234 within the inside portion of the bearing 230. Separated from and outside the seal member 240, a seal apparatus 250 for a magnetic fluid is provided.

The non-contact seal member 240 comprises an elastic rubber member 241 having lip portion 242. The elastic rubber member 241 is attached to a circumferential groove 235 of the extension 233 of the outer ring 232. The rubber member 241 has a portion positioned at the outer side. The lip portion 242, positioned at the inner side, is located opposite to a circumferential groove 236 of the extension 234 of the inner ring 231 without any contact with the groove 236. Between the lip 242 and the circumferential groove 236, a U-shaped gap is formed to provide a labyrinth seal.

The ferrofluid seal apparatus 250 comprises a three-piece type magnetic fluid holding or positioning means, provided with an annular permanent magnet 251 and two pole pieces 252 and 253, and an L-shaped holder 255 made of a synthetic resin. A magnetic fluid 254 is maintained in position with the seal apparatus 250.

The inner diameters of the pole pieces 252 and 253 are set smaller than that of the permanent magnet 251, so that the magnetic flux from the permanent magnet 251 can be converged. Thus, two small seal gaps are provided between a cylindrical face 237 of the extension 234 of the inner ring 231 and the inner sides of the pole pieces 252 and 253, in which a strong magnetic field with the permanent magnet 251 is formed to attract and maintain the magnetic fluid 254. The holder 255 comprises a cylinder 256 and an extended portion 257. The cylinder 256 serves to support the magnetic fluid holding or positioning means. The cylindrical portion 256 is attached to a cylindrical face 238 of the extension 233 of the outer ring 232. The extended portion 257 extends from an end of the cylindrical portion 256 in the radial direction of the bearing 230 toward the inner side of the bearing 230, along the side of the pole piece 253. The extended portion 257 is provided for preventing the magnetic fluid from splashing.

Figure 11:
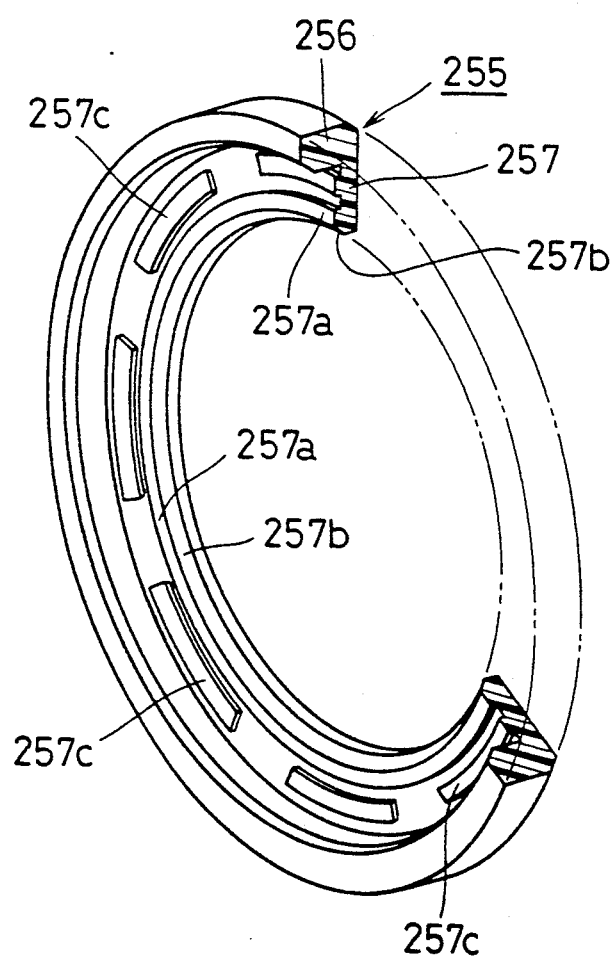
FIG. 11 is a perspective view of a holder of a seal apparatus adapted for the bearing of FIG. 10.

Further, as shown in FIG. 10 and FIG. 11, an annular projection 257a is provided at the inner side of the extended portion 257. A tapered cut-away portion 257b is formed at the inner side of the annular projection 257a. Spaced projections 257c are formed at several portions along the side face of the extended portion 257 for strengthening the extended portion 257. With the provision of the projections 257c, the extended portion 257 is strengthened by being thickened.

To position the ferrofluid seal apparatus 250, the magnetic fluid holding or positioning means is located adjacent to the cylinder 256 of the holder 255 with the outer diameter of the magnetic fluid holding or positioning means being a little smaller than the inner diameter of the cylinder 256.

The outer side of the pole piece 253 of the magnetic fluid holding or positioning means is in contact with the annular projection 257a and the projections 257c of the extended portion 257 of the holder 255. An adhesive 260 is applied to connect the inner face of the cylinder 256 with the outer face of the magnetic fluid holding or positioning means, and the outer face of the pole piece 252 with the inner face of the extended portion 257. The adhesive 260 is further applied to connect the ferrofluid seal apparatus 250 with the extension 233 of the outer ring 232. According to this preferred embodiment, the corner of the cylinder 256 of the holder 255 is tapered, so that a v-shaped groove can be formed between the tapered portion and the cylindrical face 238 of the extension 238 of the outer ring 232. The adhesive 260 is filled within the V-shaped groove to provide a complete seal.

The cut-away 257b formed at the inner edge of the extended portion 257 of the holder 255 forms a V-shaped recess in combination with the outer side of the pole piece 253. When a part of the magnetic fluid 254 is splashed by a centrifugal force due to rotation along the outer side of the pole piece 253, this part of the magnetic fluid 254 can be caught within the V-shaped recess between the cut-away 257b and the extended portion 257. Upon stopping of the rotation, any magnetic fluid 254 stored within the V-shaped recess is returned to a position between the pole piece 253 and the extension 234 of the inner ring 231.

Thus, in the ferrofluid seal apparatus 250, the magnetic fluid holding or positioning means is supported by the holder 255, so that the cylindrical portion 256 of the holder 255 is connected to the extension 233 of the outer ring 232. During attachment, no elastic deformation of the holder 255 is caused, so that the holder 255 can be precisely attached to accurately control a gap for positioning and storing the magnetic fluid.

To provide the bearing 230, the non-contact seal member 240 is attached, and the inner and the outer rings 231 and 232 are extended to provide the extensions 233 and 234 to which the ferrofluid seal apparatus 250 is connected. Thus, a double seal structure is provided. Although the axial size of the bearing 230 is somewhat large, good seal characteristics can be maintained because of the following reason. The seal member 240 is positioned at the inside of the ferrofluid seal apparatus 250, so that a predetermined gap is provided between a seal gap with the seal member 240 and another seal gap with the ferrofluid seal apparatus 250 for storing the magnetic fluid. The two seal gaps do not closely follow each other. Even if an inner lubricant is leaked through the seal gap of the seal member 240, the leaked lubricant is stored within a space between the seal member 240 and the ferrofluid seal apparatus 250 by centrifugal force. Therefore, the leaked lubricant is prevented from mixing into the magnetic fluid 254 at the ferrofluid seal apparatus 250.

In place of the synthetic resin, the holder 255 may be made of a magnetic material. Further, the adhesive 260 for bonding the magnetic fluid holding means with the holder 255 and the holder 255 with the outer ring 232 may be of a specific type of adhesive which can be hardened when exposed to ultraviolet ray. Such a specific type of adhesive can be readily introduced into a connected portion to thereby simplify the assembly process.

Figure 12:
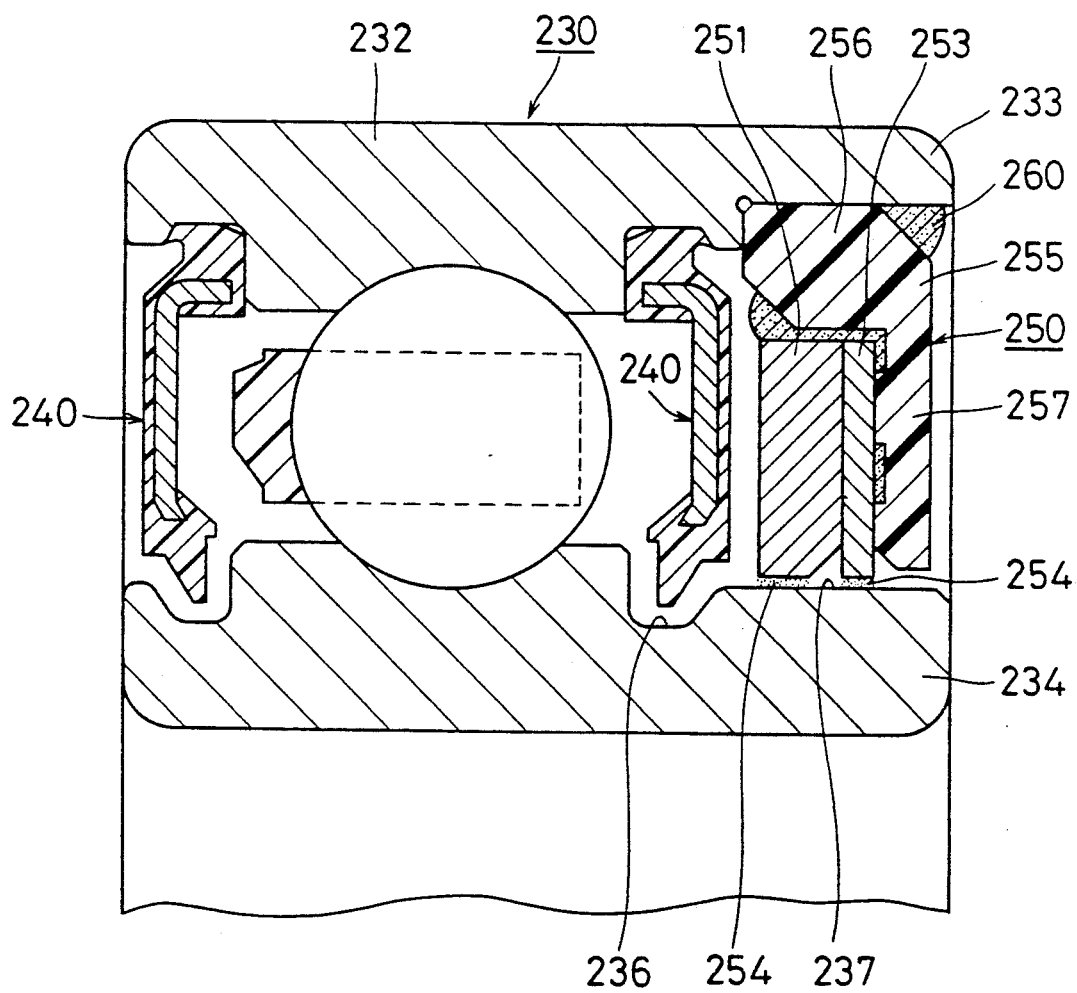
FIGS. 12 and 13 are cross-sectional views of bearings according to the tenth and the eleventh preferred embodiments of the present invention.
Figure 13:
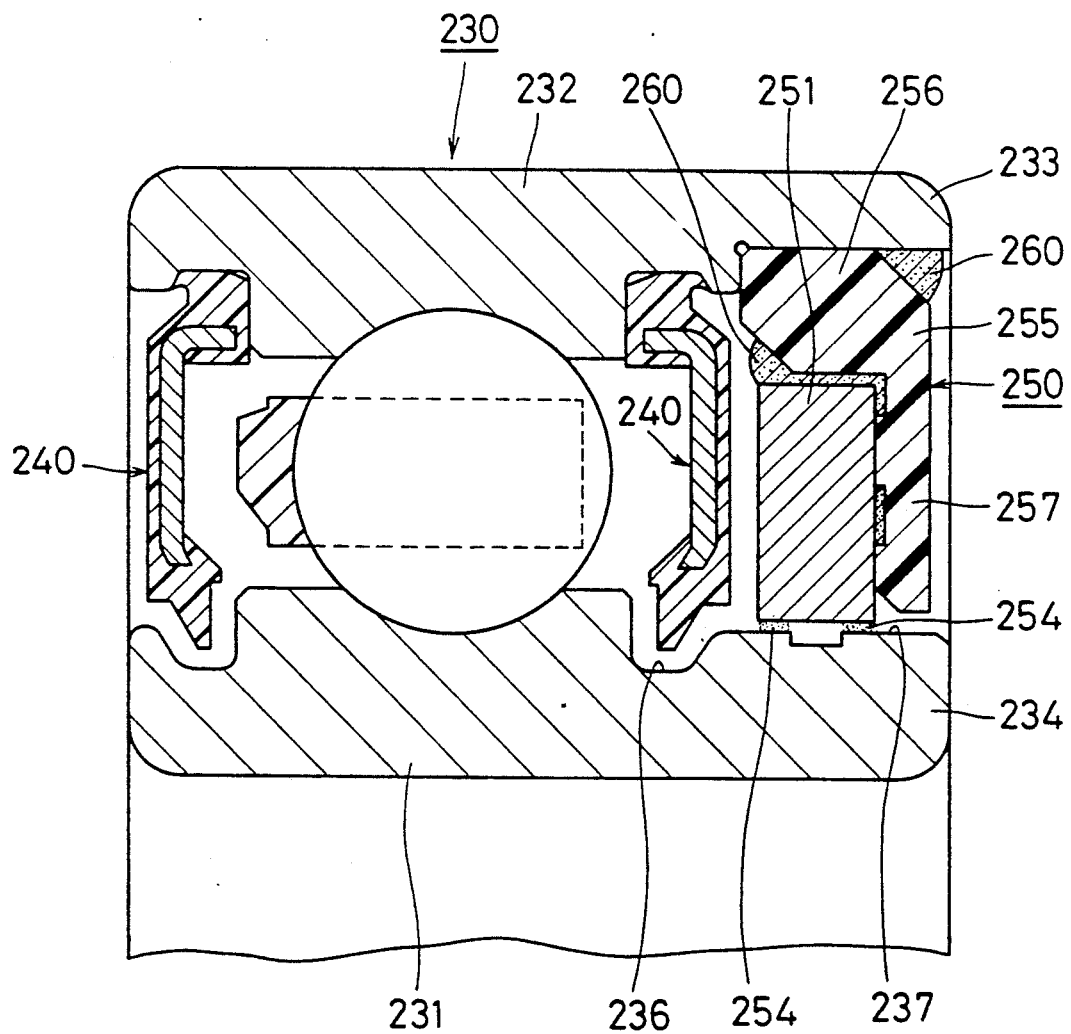

Instead of the three-piece type magnetic fluid holding means comprising the permanent magnet 251 and the two pole pieces 252 and 253 as described in connection with the ninth preferred embodiment of FIG. 10, a two-piece type magnetic fluid holding or positioning means as shown in FIG. 12 may be applied in which the pole piece 252 positioned adjacent the seal member 240 is eliminated. Further, the two pole pieces 252 and 253 are eliminated to provide the permanent magnet 251 per se as shown in FIG. 13. In the embodiments of FIGS. 12 and 13, the magnetic fluid 254 is held or positioned at two axially separated points. In FIG. 13, a recess is provided for separating two areas having magnetic fluid attracted by the permanent magnet 251 from each other.

According to the ninth through the eleventh preferred embodiments of the present invention, the cylindrical portion of the holder supporting the magnetic fluid holding or positioning means is connected to the outer ring, so that the holder can be accurately attached to precisely control the magnetic fluid holding gap. The extended portion of the holder can catch the magnetic fluid splashed with centrifugal force on its inner face. The magnetic fluid is thus stably maintained. Further, in the bearing, a double seal structure can be provided by interposing a predetermined seal gap between the seal member and the magnetic fluid seal unit, the seal gaps of the seal member and the magnetic fluid seal unit not closely following each other. Even if an inner lubricant is leaked through the gap of the seal member from the inner side of the bearing, the leaked lubricant is prevented from entering into the seal gap of the magnetic fluid seal unit. The pressure capacity of the magnetic fluid seal unit can be maintained for a long time.

Figure 14:
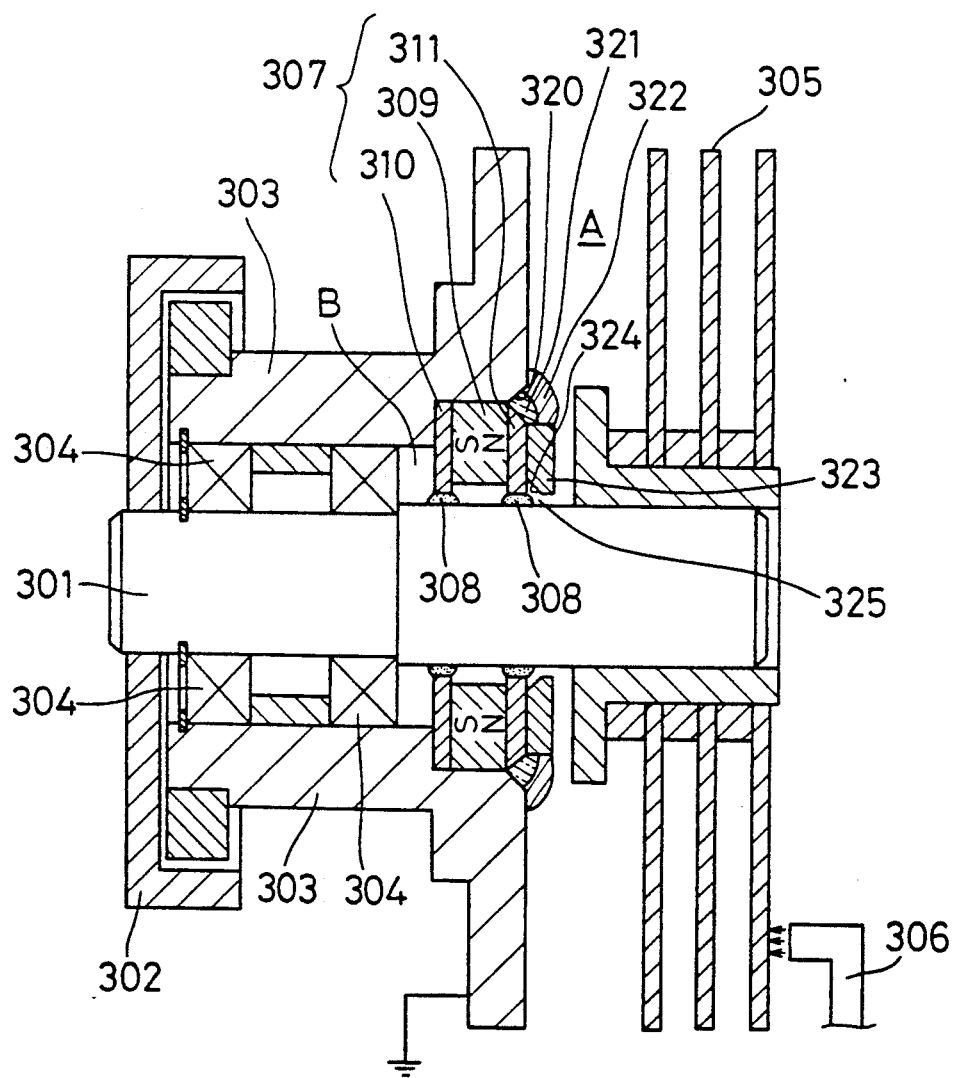
FIG. 14 is a cross-sectional view of a spindle motor incorporating a seal apparatus according to the twelfth preferred embodiment of the present invention.

FIG. 14 shows a seal apparatus according to the twelfth preferred embodiment of the present invention. The seal apparatus is shown as applied to a spindle motor for rotating a magnetic disk or the like. The spindle motor of FIG. 14 comprises a spindle shaft 301, a motor 302, a housing 303, and a rolling bearing 304.

The spindle shaft 301 is rotated by the motor 302. The spindle shaft 301 is rotatably attached to the housing 303 via the rolling bearing 304. A plurality of magnetic disks 305 ar attached to an end of the spindle shaft 301. A magnetic head 306 is provided for reading-out data stored in the magnetic disks 305.

The magnetic disks 305 and the magnetic head 306 are operated in a clean space A. A seal unit is provided between the magnetic disks 305 and the rolling bearing 304 for preventing dust, such as a lubricant from the rolling bearing 304, from invading into the space A. The sealing apparatus comprises a magnetic fluid holding or positioning member 307 for storing or retaining a magnetic fluid 308. The magnetic fluid holding or positioning member 307 comprises an annular magnet 309 and a pair of pole pieces 310 and 311, attached to both sides of the annular magnet 309, axially.

The magnetic fluid holding or positioning member 307 is positioned at the inner face of the housing 303. The inner side of the magnetic fluid holding or positioning member 307 is opposed to the outer side of the spindle shaft 301 without any contact to provide a radial gap. With this arrangement, a strong magnetic field is formed between the pair of pole pieces 310 and 311 of the magnetic fluid holding or positioning member 307 and the spindle shaft 301 to thereby maintain the magnetic fluid 308 within the radial gap.

Within the magnetic fluid holding member 307, a V-shaped circumferential groove 320 is formed at an edge between the pole piece 311 and the housing 303.

An electrically conductivè adhesive 321 is positioned at several points in the circumferential groove 320 between the pole piece 311 and the housing 303 so as to extend over the pole piece 311 and the housing 303. Over the conductive adhesive 321, a sealing adhesive 322 is provided along the entire length of the V-shaped circumferential groove 320. An annular plate (side member) 323 with a tapered cut-away portion 324 at its inner side is attached to the outer side of the pole piece 311. A storage section 325 is thereby formed for storing any magnetic fluid 308 which may flow out of the radial gap between the pole piece 311 and the spindle shaft 301. The storage section 325 is provided between the pole piece 311 and the inner side of the annular plate 323.

With the twelfth preferred embodiment of the present invention, even if a fine clearance is present at the edge between the magnetic fluid holding or positioning member 307 and the housing 303, due to manufacturing allowance or tolerances, the sealing adhesive 322 can close the fine clearance to completely isolate the clean space A and the space B. The conductive adhesive 321 can bond the housing 303 with the magnetic fluid holding member 307. When the spindle shaft 301 rotates at high speed, electrostatic charges can be transferred into the housing 303 via the magnetic fluid holding or positioning member 307 and the electrically conductive magnetic fluid 308.

Normally, the amount of the magnetic fluid 308 is greater than the volume of the radial gap provided to store the magnetic fluid 308 to enhance the resistivity of the spindle motor. Thus, the magnetic fluid 308 normally extends out of the annular gap. The storage section 325 formed at the inner side of the annular plate 323 serves to store magnetic fluid which extends out of the radial gap between the pole piece 311 and the spindle shaft 301, due to centrifugal force of rotation without any magnetic fluid being splashed into the housing 303. Although a part of the magnetic fluid 308 may flow out of the radial gap, the storage section 325 can catch such magnetic fluid 308.

Upon the termination of the rotation, the part of the magnetic fluid 308 stored by the storage section 325 can return to the radial gap. In the above description of the twelfth preferred embodiment, the spindle shaft 301 is assumed to rotate. The housing 303 can rotate with the same structure, in this case the magnetic fluid 308 tends to remarkably splash and the storage section 325 can stop the splashing of the magnetic fluid 308.

When the magnetic fluid 308 moves to the storage section 325, the magnetic fluid 308 may be a little attracted up to the junction between the pole piece 311 and the annular plate 323 owing to capillary phenomena. The conductive adhesive 321 and the sealing adhesive 322 positioned at the outside of the junction suppress such capillary attraction.

Preferably, the volume of the storage section 325 is about 30-50% as much as the volume of the magnetic fluid 308 stored within the radial gap positioned at the pole piece 311. The total volume of the magnetic fluid 308 initially stored within the radial gap is set greater than that of the magnetic fluid actually stored or positioned within the radial gap. The sealing adhesive 322 may be a type of adhesive which can be hardened when exposed to ultraviolet ray and may have low or high viscosity.

According to the twelfth preferred embodiment of the present invention, the clean space A can be completed isolated from the space B. The electrostatic charges accumulated on the spindle shaft 301 can be transferred to the ground via the housing 303. Since the storage section 325 can catch magnetic fluid 308 which splashes due to centrifugal force, the magnetic fluid 308 is prevented from splashing into the clean space A. Thus, the clean space A cannot be polluted.

Figure 15:
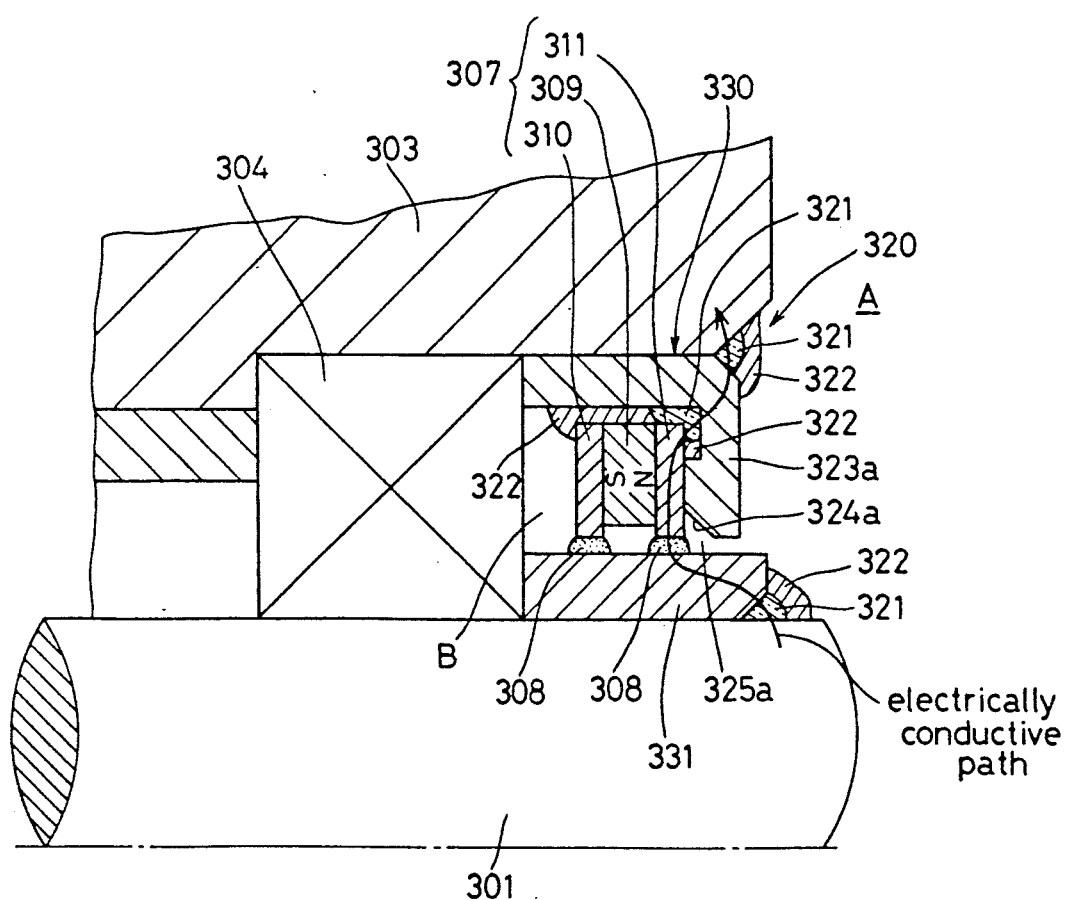
FIG. 15 is a cross-sectional view of a spindle motor incorporating a seal apparatus according to the thirteenth preferred embodiment of the present invention.

FIG. 15 shows a seal apparatus according to the thirteenth preferred embodiment of the present invention. This preferred embodiment is characterized in that the size of the radial gap, in the direction of its diameter, for storing the magnetic fluid 308 can be equally controlled in the axial direction by fixing the magnetic fluid holding member 307 to the housing 303 via an annular holder 303 and further fixing a cylindrical collar 331 to the spindle shaft 301. The cylindrical collar 331 has an accurate surface. The holder 330 is provided with a flange 323a inwardly directed. A cut-away portion 324a of the flange 323a and the outer side of the pole piece 311 form a storage section 325a for storing a part of the magnetic fluid 308 splashed out of the magnetic fluid 308 stored within the radial gap.

In terms of this preferred embodiment, a predetermined gap is present between the spindle shaft 301 and the collar 331, the holder 330 and the magnetic fluid holding member 307, and the housing 303 and the holder 330 by selecting the sizes of the respective elements. For assembly, the magnetic fluid holding member 307 is initially fixed to the holder 330, accurately. Second, the collar 331 is accurately fixed to the spindle shaft 301. The holder 330 is bonded to the housing 303 and is accurately positioned relative to the collar 331.

The electrically conductive adhesive 321 is positioned at several points along the edge of the junction between the holder 330 and the housing 303, of the junction between the holder 330 and the magnetic fluid holding member 307, and the edge of the junction between the collar 331 and the spindle shaft 301 so as to extend over the edges of junction. The sealing adhesive 322 is provided over the conductive adhesive 321 along the entire edges of the junctions so as to extend over them. Preferably, the sealing adhesive 322 applied at the junction between the holder 330 and the magnetic fluid holding member 307 may be an adhesive of the type which can be hardened when exposed to ultraviolet ray, with low viscosity, to readily provide the junction and simplify the assembly.

Figure 16:
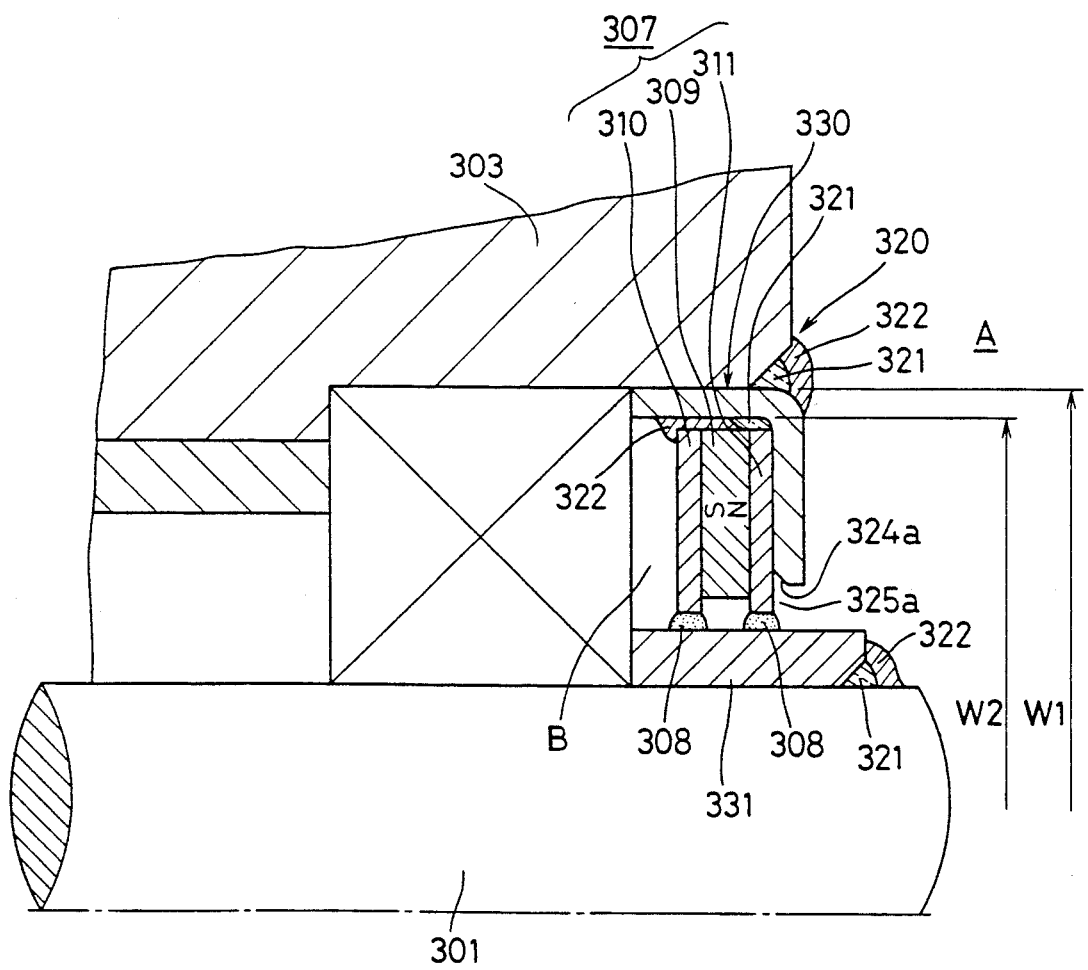
FIG. 16 is a cross-sectional view of a spindle motor incorporating a seal apparatus according to the fourteenth embodiment of the present invention.
Figure 17A:
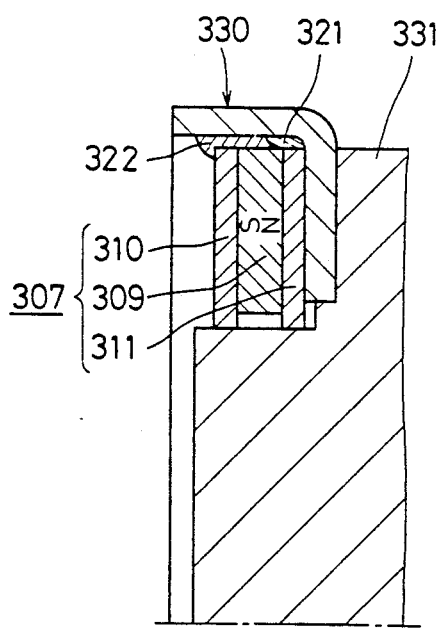
FIGS. 17 (a) and 17 (b) are cross-sectional views for explaining assembly methods of the fourteenth embodiment of the present invention.
Figure 17B:
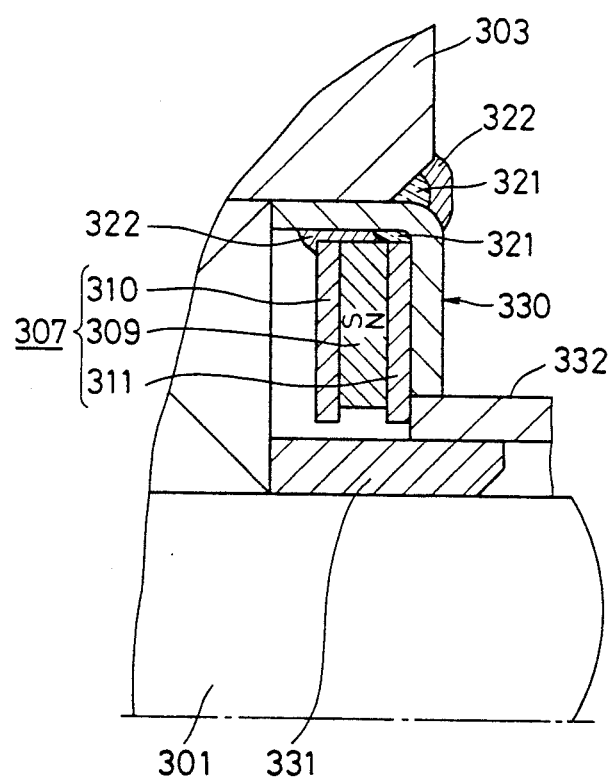

The holder 330 which may be made of an aluminum alloy, copper alloy, or a stainless steel of a nonmagnetic material is ground to form an L-shape in a sectional form. The holder 330 should not be limited to these ground works. As FIG. 16 shows, a plate made of these materials is pressed as the L-shape. This remarkably reduces the cost of production. When the pressed holder 330 is used for the assembly, the accuracy of the outer dimension W1 and inner dimension W2 is inferior to the ground holder. However, assembly methods as shown in FIGS. 17 (a) and 17 (b) can improve the poor accuracy. To assemble with the pressed holder 330, as shown in FIG. 17 (a), the holder 330 and the magnetic fluid holding member 307 are incorporated into an engagement instrument or jig 331. An electrically conductive adhesive 321 is applied at the innermost connection between the holder 330 and the magnetic fluid holding member 307. A sealing adhesive 322 is further provided over the conductive adhesive 321 for sealing. As FIG. 17 (b) shows, the integral combination of the holder 330 and the magnetic fluid holding member 307 is inserted between the housing 303 and a collar 331. While the holder 330 is guided by another engagement instrument 332 the electrically conductive adhesive 321 is applied to a plurality of portions along the outer edges at the connection between the holder 330 and the housing 303. Over the entire portions of the connection, the sealing adhesive 322 is applied for sealing.

According to the thirteenth preferred embodiment, the length of the radial gap in the direction of the diameter can be equally selected in the axial direction. The clean space A can be completely isolated as in the twelfth preferred embodiment. An electrically conductive path is made between the spindle shaft 301 and the housing 303 as indicated by an arrow in FIG. 15. When the magnetic fluid 308 moves toward the storage section 325, the capillary attraction of the magnetic fluid 308 to the junction between the flange 323a of the holder 330 and the outer face of the pole piece 311 can be regulated as in the case of the twelfth preferred embodiment.

In the twelfth and the thirteenth preferred embodiments, the conductive adhesives 321 are applied at several points of the circumference. The adhesives 321 can be applied to the entire circumference like the sealing adhesive 322. The magnetic fluid holding member 307 comprises the annular magnet 309 and the pair of pole pieces 310 and 311. The pole pieces 310 positioned adjacent the rolling bearing 304 can be eliminated, and further, both of the pair of pole pieces 310 and 311 can be eliminated to simply provide the annular magnet 309. In the case where the magnet fluid holding member 307 only comprises the annular magnet 309, preferably, the annular magnet 309 may be conductive and made of plastic. In these preferred embodiments, the spindle shaft 301 is rotated, but the housing 303 can be rotated, in which case similar effects can be attained with the same construction as above described.

According to the twelfth and the thirteenth preferred embodiment of the present invention, the sealing adhesive is applied to seal the fine clearance at the joint between the outer element and the magnetic fluid holding meter due to manufacture allowance or tolerances. The spaces at the opposing side of the magnetic fluid holding member can be completely separated. The electrically conductive adhesive is applied to bond the magnetic fluid holding member with the outer element. The outer element may be stationary or rotating so that both elements are relatively rotating. The electric conductivity of the magnetic fluid holding member and the outer element can be ensured.

Further, the electrically conductive magnetic fluid is maintained between the magnetic fluid holding member and the inner element, so that the electric conductivity between the relatively rotating inner and outer elements can be completely established.

Thus, the sealing characteristics and the electric conductivity of the sealing unit can be accomplished.

While only certain embodiments of the present invention have been described, it will be apparent to those skilled in the art that various changes and modifications may be made therein without departing from the spirit and scope of the present invention as claimed.

What is claimed is:

1. In a sealing apparatus for sealing two rings made of a magnetic material coaxially and relatively rotated through a plurality of rolling members in which a magnetic fluid holding means for storing a magnetic fluid is provided, said magnetic fluid holding means being attached to one of said two rings to form a fine annular clearance, so that the magnetic fluid is positioned within the fine annular clearance, said magnetic fluid holding means comprising:
    an annular magnetic piece positioned in a member made of a non-magnetic material, said member including an annular portion engaged with said one of said two rings and a radial flange portion extended from an end of said annular portion toward the other of said rings to form said fine annular clearance;
    said annular magnetic piece having a free end and being fixed to an annular step provided by said annular portion and said radial flange portion of said member, and axially magnetized to provide a magnetic circuit via said fine annular clearance adjacent the other of said two rings made of the magnetic material, so that said magnetic circuit retains the magnetic fluid;
    a non-magnetic metal plate fixed to an axial side of said magnetic piece opposed to said radial flange portion of said member, an end of said non-magnetic metal plate extending toward the other of said two rings to form an additional fine annular clearance with the surface of the other of said two rings; and
    a recess, formed at a circumferential portion of said free end of said magnetic piece adjacent said non-magnetic metal plate for preventing the magnetic fluid from flowing away from said magnetic fluid holding means.

2. The sealing apparatus as set forth in claim 1, wherein said magnetic piece comprises an annular permanent magnet and an annular pole piece made of a magnetic material fixed to an axial side of the annular permanent magnet.

3. The sealing apparatus as set forth in claim 1, wherein there is provided a circumferential step in an axial end of the other of said rings to form said fine annular clearance between the annular circumference of the circumferential step and said magnetic fluid holding means, and a labyrinth seal lip extending axially toward a free end of said radial flange portion of said member made of the non-magnetic material to form an additional fine annular clearance with the remaining circumference of said one of said rings.

4. In a sealing apparatus for sealing two rings made of a magnetic material coaxially and relatively rotated through a plurality of rolling members in which a magnetic fluid holding means for storing a magnetic fluid is provided, said magnetic fluid holding means being attached to one of said two rings to form a fine annular clearance, so that the magnetic fluid is positioned within the fine annular clearance, said magnetic fluid holding means comprising:
    an annular magnetic piece positioned in a member made of a body made of a resin and a plate made of non-magnetic metal, said body including an annular portion engaged with said one of said two rings and a radial flange portion extended from an end of said annular portion toward the other of said rings to form said fine annular clearance, said non-magnetic metal plate is integrally provided in said body to form a radial section of an annular step provided by said annular portion and said radial flange portion of said member, an end of said non-magnetic metal plate extending toward the other of said rings to form the fine annular clearance with the surface of the other of said rings,
    said annular magnetic piece having a free end and being fixed to said annular step, and axially magnetized to provide a magnetic circuit via said fine annular clearance adjacent the other of said rings made of the magnetic material, so that said magnetic circuit retains the magnetic fluid; and
    a recess located in said annular magnetic piece at a circumferential portion of said free end of said annular magnetic piece, for preventing the magnetic fluid from flowing away from said magnetic fluid holding means.

5. In a sealing apparatus for sealing two rings made of a magnetic material coaxially and relatively rotated through a plurality of rolling members in which a magnetic fluid holding means for storing a magnetic fluid is provided, said magnetic fluid holding means being attached to one of said two rings to form a fine annular clearance, so that the magnetic fluid is positioned within the fine annular clearance, said magnetic fluid holding means comprising:
    an annular magnetic piece positioned in a member of a body made of rubber and a plate made of non-magnetic metal, said body including an annular portion engaged with said one of said two rings and a radial flange portion extended from an end of said annular portion toward the other of said rings to form said fine annular clearance, said non-magnetic metal plate is integrally provided in said body to form a radial section of an annular step provided by said annular portion and said radial flange portion of said member, an end of said non-magnetic metal plate extending toward the other of said rings to form the fine annular clearance with the surface of the other of said rings, said annular magnetic piece having a free end and being fixed to said annular step, and axially magnetized to provide a magnetic circuit via said fine annular clearance adjacent the other of said rings made of the magnetic material, so that said magnetic circuit retains the magnetic fluid; and a recess located in said annular magnetic piece at a circumferential portion of said free end of said annular magnetic piece, for preventing the magnetic fluid from flowing away from said magnetic fluid holding means.

6. The sealing apparatus as set forth in claim 5, wherein said annular magnetic piece comprises an annular permanent magnet.

7. The sealing apparatus as set forth in claim 5, wherein said annular magnetic piece comprises an annular permanent magnet and an annular pole piece made of a magnetic material fixed to an axial side of the annular permanent magnet.

8. The sealing apparatus as set forth in claim 5, wherein there is provided a circumferential step in an axial end of said other of said rings to form said fine annular clearance between an annular surface of the circumferential step and said magnetic fluid holding means, and a labyrinth seal lip extending axially from said radial flange portion of said body made of a rubber to form an additional fine annular clearance with the remaining circumference of said one of said rings.

9. The seal apparatus as set forth in claim 5, wherein there is an additional non-magnetic metal plate fixed to an axial side of said magnetic piece opposed to said radial flange portion of said member, an end of said non-magnetic metal plate extending toward said other of said rings to form an additional fine annular clearance with the surface of the other of said rings.

10. The seal apparatus as set forth in claim 9, wherein said additional fine annular clearance between said non-magnetic metal plate and the other of said rings is narrower than said fine annular clearance between said magnetic piece and the other of said rings.

* * * * *